United States Patent
Shitabou (10) Patent No.: US 9,344,023 B2
(45) Date of Patent: May 17, 2016

(54) MOTOR DEVICE

(71) Applicant: NIDEC CORPORATION, Kyoto (JP)

(72) Inventor: Hiroyuki Shitabou, Kyoto (JP)

(73) Assignee: NIDEC CORPORATION (JP)

( * ) Notice: Subject to any disclaimer, the term of this patent is extended or adjusted under 35 U.S.C. 154(b) by 349 days.

(21) Appl. No.: 13/751,664

(22) Filed: Jan. 28, 2013

(65) Prior Publication Data

US 2013/0193883 A1    Aug. 1, 2013

(30) Foreign Application Priority Data

Jan. 31, 2012   (JP) ................................. 2012-019258

(51) Int. Cl.
*H02K 29/12*  (2006.01)
*H02P 7/06*   (2006.01)
*H02P 6/00*   (2016.01)

(52) U.S. Cl.
CPC . *H02P 7/066* (2013.01); *H02P 6/00* (2013.01)

(58) Field of Classification Search
CPC ............. H02P 6/14; H02P 6/08; H02P 6/182; H02K 29/12; H02K 29/08
USPC ......... 318/400.01, 400.37, 461, 432
See application file for complete search history.

(56) References Cited

U.S. PATENT DOCUMENTS

| | | | | |
|---|---|---|---|---|
| 4,879,502 A * | 11/1989 | Endo et al. | ...... | 318/723 |
| 5,050,057 A * | 9/1991 | Notohara et al. | ...... | 363/37 |
| 5,220,259 A * | 6/1993 | Werner et al. | ...... | 318/432 |
| 5,294,872 A * | 3/1994 | Koharagi et al. | ...... | 318/400.15 |
| 5,675,231 A * | 10/1997 | Becerra et al. | ...... | 318/801 |
| 5,712,540 A | 1/1998 | Toda et al. | | |
| 6,775,468 B2 * | 8/2004 | Zinke | ...... | H02P 6/14 388/800 |
| 6,855,016 B1 * | 2/2005 | Jansen | ...... | 440/6 |
| 7,710,064 B2 * | 5/2010 | Sakurai | ...... | H02M 1/38 318/400.26 |
| 7,777,433 B2 * | 8/2010 | Yamaguchi | ...... | H02M 7/003 318/139 |
| 7,835,630 B2 * | 11/2010 | Kazanzides et al. | ...... | 388/815 |
| 8,841,876 B2 * | 9/2014 | Leaver et al. | ...... | 318/721 |
| 2005/0155369 A1 * | 7/2005 | Ootori | ...... | F24F 11/001 62/228.1 |
| 2005/0264113 A1 * | 12/2005 | Suzuki | ...... | F16K 31/04 310/80 |
| 2006/0290226 A1 | 12/2006 | Ohkawa et al. | | |
| 2008/0272762 A1 * | 11/2008 | Kurahashi | ...... | H02P 6/002 324/103 R |
| 2009/0256505 A1 * | 10/2009 | Maeda | ...... | H02P 6/16 318/400.07 |
| 2012/0012772 A1 * | 1/2012 | Moore | ...... | H02K 5/128 251/318 |

FOREIGN PATENT DOCUMENTS

| | | |
|---|---|---|
| CN | 1116291 A | 2/1996 |
| CN | 1813393 A | 8/2006 |
| JP | 5-137375 A | 6/1993 |
| JP | H0835713 A | 2/1996 |
| WO | 2005002028 A1 | 1/2005 |

* cited by examiner

*Primary Examiner* — Rina Duda
(74) *Attorney, Agent, or Firm* — Cantor Colburn LLP (57) ABSTRACT

A motor device includes a motor unit and a converter unit. The motor unit includes an inverter circuit; an inverter drive circuit; a brushless DC motor comprising a rotor and a stator; a first shunt resistor; a first input terminal; a second input terminal; a third input terminal; a first output terminal; and a first ground terminal. The converter unit includes a case; a AC/DC converter; a microcomputer; a first output terminal; a second output terminal; a third output terminal; a first input terminal; a second shunt resistor; and a second grounding terminal. The microcomputer calculates a current value by using the terminal voltage and a resistance value of the second shunt resistor, compares the current value with a specified current value, and limit or cut off the output of the analog control signal when the current value exceeds the specified current value.

13 Claims, 6 Drawing Sheets

MOTOR DEVICE

CROSS REFERENCE TO RELATED APPLICATIONS

The present application claims priority under 35 U.S.C. §119 to Japanese Application No. 2012-019258, filed Jan. 31, 2012, the entire content of which is incorporated herein by reference.

FIELD OF THE INVENTION

The present invention relates to a motor device.

BACKGROUND

In general, an AC/DC converter for converting an AC current to a DC current is needed in order to drive a brushless DC motor (hereinafter simply referred to as "motor") with an AC power source. The DC current outputted from the AC/DC converter is converted to a three-phase drive current by an inverter circuit. The motor is rotated by supplying the drive current to the motor.

The AC/DC converter is provided at the outside of the motor in some cases and inside the motor in other cases. The external electric power is often supplied in the form of an AC current. For that reason, a motor that can be rotated by supplying the AC current is preferred in some cases.

In case where an AC power is supplied to the motor, it is necessary to arrange the AC/DC converter inside the motor as stated above. However, in case where a DC power is supplied to the motor, the AC/DC converter becomes useless. Moreover, the size of the motor grows larger in proportion to the size of the AC/DC converter.

In the meantime, a demand has existed for a motor whose rotation speed can be adjusted with a digital speed limiting signal. To this end, a microcomputer needs to be installed within the motor. It is necessary to install the microcomputer at the upstream side of an inverter drive circuit. However, if the microcomputer is mounted on an electric circuit board arranged within the motor, the electric circuit board grows larger in size and the size of the motor also becomes larger.

In view of the above, the brushless DC motor that can be driven with the AC power and whose rotation speed can be adjusted by a digital speed limiting signal becomes larger in size. Moreover, if the DC power is supplied to the motor, the unnecessary AC/DC converter leads to increase in the cost and size of the motor.

SUMMARY

In accordance with an illustrative embodiment, a motor device includes a motor unit and a converter unit. The motor unit includes a brushless DC motor, an inverter circuit, and an inverter drive circuit. The inverter circuit supplies a drive current to the brushless DC motor. The inverter drive circuit supplies a drive pulse signal to the inverter circuit. The converter unit is connected to the motor unit. The converter unit includes an AD/DC converter and a microcomputer. The AC/DC converter converts an AC voltage to a DC voltage to be supplied to the motor unit. The microcomputer receives a digital control signal and outputs an analog control signal. The inverter drive circuit receives the analog control signal outputted from the microcomputer and outputs a drive pulse signal to be supplied to the inverter circuit.

In accordance with the illustrative embodiment, the microcomputer configured to control the rotation speed of the motor is provided in the converter unit connected to the motor unit including the inverter circuit and the inverter drive circuit. As a result, the AC input type motor device becomes smaller in size.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Hereinafter, embodiments of the present invention will now be described with reference to the drawings. The present invention is not limited to the embodiments described below. The present invention can be appropriately modified without departing from the scope of effects provided by the invention. The embodiments of the present invention may be combined with each other.

Figure 1:
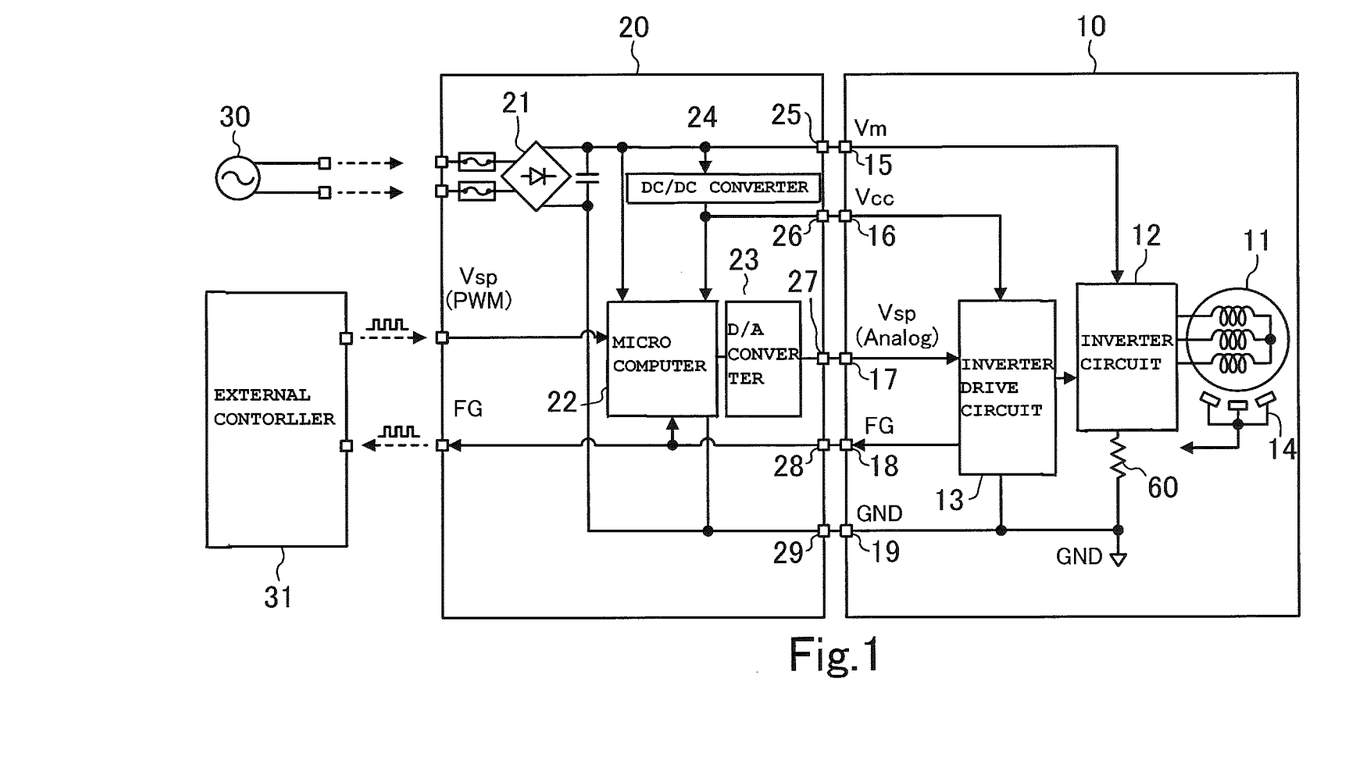
FIG. 1 is a block diagram showing a motor device according to at least a first embodiment.

FIG. 1 is a block diagram showing a motor device 1 according to at least a first embodiment.

As shown in FIG. 1, the motor device 1 includes a motor unit 10 and a converter unit 20.

The motor unit 10 includes a brushless DC motor (hereinafter simply referred to as "motor") 11, an inverter circuit 12, an inverter drive circuit 13 and a position sensor 14. The inverter circuit 12 supplies a drive current to the motor 11. The inverter drive circuit 13 supplies a drive pulse signal to the inverter circuit 12. The motor unit 10 includes a rotor and a stator. The rotor includes a rotating shaft, a rotor core, a magnet, and so forth. The stator includes a stator core, a coil, and so forth. The motor unit 10 is provided with an electric circuit board. The inverter circuit 12, the inverter drive circuit 13 and the position sensor 14 are arranged on the electric circuit board. The motor unit 10 includes input terminals 15, 16 and 17, an output terminal 18 and a grounding terminal 19.

The converter unit 20 includes an AC/DC converter 21, a microcomputer 22, a digital/analog converter (hereinafter referred to as "D/A converter") 23 and a DC/DC converter 24. The converter unit 20 includes output terminals 25, 26 and 27, an input terminal 28 and a grounding terminal 29.

The AC/DC converter 21 converts an AC voltage supplied from an external power source to a DC voltage. The microcomputer 22 can perform a speed limiting function of adjusting a pulse width of a digital speed limiting signal Vsp (PWM) received from, e.g., an external controller 31 and an abnormality detection function of detecting a rotation abnormality of the motor 11.

The speed limiting function is, for example, a function of generating a drive pulse for gradually increasing the rotation speed at the time of starting the rotation of the motor 11. The abnormality detection function is, for example, a function of referring to a position detection signal sent from the position sensor 14 and outputting an error signal to the external controller 31 if a rotation abnormality is generated in the motor 11. More specifically, the abnormality detection function is a function of determining that the motor 11 has a rotation abnormality if a position detection signal is not sent from the motor unit 10 in spite of outputting a speed limiting signal to the motor unit 10, and outputting an error signal to the external controller 31.

The functions of the microcomputer 22 described herein are nothing more than one example. The position detection signal is, e.g., an FG (Frequency Generator) signal. The D/A converter 23 converts the digital speed limiting signal outputted from the microcomputer 22 to an analog signal to output the analog speed limiting signal Vsp (Analog). Further, the microcomputer 22 may be configured to include a D/A converter 23 for converting the digital speed limiting signal Vsp (PWM) to the analog speed limiting signal Vsp. The DC/DC converter 24 converts a DC voltage supplied from the AC/DC converter 21 to a specified DC voltage. In the present embodiment, the DC/DC converter 24 converts the DC voltage to a voltage Vcc which is to be supplied to the inverter drive circuit 13.

The motor 11 is, e.g., a three-phase motor. The inverter circuit 12 includes a plurality of switching elements. If the motor 11 is the three-phase motor, the inverter circuit 12 includes six switching elements. The inverter drive circuit 13 receives the analog speed limiting signal Vsp (Analog) outputted from the D/A converter 23. The inverter drive circuit 13 outputs a drive pulse signal to the inverter circuit 12 in conformity with the rotor position detection signal detected by the position sensor 14. More specifically, the inverter drive circuit 13 performs PWM control and outputs the drive pulse signal by using the analog speed limiting signal Vsp (Analog) outputted from the D/A converter 23 and the position detection signal outputted from the position sensor 14.

The inverter circuit 12 receives the drive pulse signal outputted from the inverter drive circuit 13 and supplies a drive current to a coil of the motor 11, so that the rotation of the motor 11 can be controlled. The position sensor 14 outputs a position detection signal by detecting the position of the rotor of the motor 11. The position sensor 14 can be realized by, e.g., a Hall sensor capable of detecting the flux of a magnet provided in the rotor.

The input terminal 15 is connected to a motor voltage input terminal of the inverter circuit 12 within the motor unit 10. The input terminal 16 is connected to a power supply terminal of the inverter drive circuit 13 within the motor unit 10. The input terminal 17 is connected to a speed-limiting-signal input terminal of the inverter drive circuit 13 within the motor unit 10. The output terminal 18 is connected to a position information output terminal of the inverter drive circuit 13 within the motor unit 10.

The AC/DC converter 21 converts the AC voltage supplied from a power source 30 to a DC voltage. The DC voltage is supplied to each of the microcomputer 22, the inverter circuit 12 and the inverter drive circuit 13. The DC voltage converted by the AC/DC converter 21 is converted by the DC/DC converter 24 to a DC voltage having a specified voltage value. For example, a DC voltage Vm converted by the AC/DC converter 21 is supplied to the inverter circuit 12. The DC voltage Vcc converted by the DC/DC converter 24 is supplied to the inverter drive circuit 13. The DC/DC converter 24 may not be provided if the inverter drive circuit 13 is operable with the DC voltage converted by the AC/DC converter 21.

The output terminal 25 is connected to the AC/DC converter 21 within the converter unit 20. The output terminal 26 is connected to the DC/DC converter 24 within the converter unit 20. The output terminal 27 is connected to the D/A converter 23 within the converter unit 20. The input terminal 28 is connected to the microcomputer 22 within the converter unit 20.

The converter unit 20 can be connected to the motor unit 10. The AC input type motor device 1 is a motor device in which the motor unit 10 and the converter unit 20 are connected to each other. Upon connecting the motor unit 10 and the converter unit 20 to each other, the input terminal 15 and the output terminal 25 are connected to each other. The input terminal 16 and the output terminal 26 are connected to each other. The input terminal 17 and the output terminal 27 are connected to each other. The output terminal 18 and the input terminal 28 are connected to each other. The grounding terminal 19 and the grounding terminal 29 are connected to each other.

As a consequence, the motor unit 10 can receive the motor voltage Vm from the converter unit 20 through the output terminal 25 and the input terminal 15. The motor unit 10 can receive the power supply voltage Vcc from the converter unit 20 through the output terminal 26 and the input terminal 16. The motor unit 10 can receive the analog speed limiting signal Vsp (Analog) from the converter unit 20 through the output terminal 27 and the input terminal 17. The converter unit 20 can receive the FG signal from the motor unit 10 through the output terminal 18 and the input terminal 28.

With the motor device 1 in accordance with the present embodiment, the microcomputer 22 is provided in the converter unit 20. This makes it possible to reduce the size of the electric circuit board provided in the motor unit 10, eventually reducing the size of the motor unit 10. The microcomputer 22 controls the rotation speed of the motor 11. The converter unit 20 is connected to the motor unit 10. Accordingly, it is possible to reduce the size of the AC input type motor device.

The motor device described herein can be applied to different kinds of motor devices including, e.g., a low-output small-size motor device used in a hard disk drive and a high-output large-size motor device used in an industrial equipment. The term "possible to reduce the size" used herein does not mean that the present invention is applicable to only a small-size motor device, but does mean that it is possible to reduce the size of different kinds of motor devices.

The inverter drive circuit 13 in the motor unit 10 can be formed of a dedicated logic IC for receiving the analog speed limiting signal Vsp (Analog), performing the PWM control and outputting the drive pulse signal. It is therefore possible to reduce the size of the motor unit 10. In the present embodiment, the inverter drive circuit 13 is realized by a dedicated logic IC having only a PWM control function, and the microcomputer 22 having functions other than the PWM control function is provided in the converter unit 20. With such configuration, it is possible to reduce the size of the electric circuit board provided in the motor unit 10. This makes it possible to reduce the size of the motor unit 10.

The microcomputer 22 in the converter unit 20 receives the digital speed limiting signal Vsp (PWM) supplied from the external controller 31 to control the rotation of the motor 11. Further, the microcomputer 22 may have a function of receiving other input digital control signals to control the rotation of the motor 11. Other digital signals may be, e.g., a rotation direction command signal indicating the rotation direction of the motor 11.

If the microcomputer 22 is provided in the converter unit 20 in this manner, as compared with a case where the microcomputer 22 is provided in the motor unit 10, it is possible to cost-effectively cope with different kinds of input control signals. In other words, the external controller 31 includes an analog signal output type and a digital signal output type. A manufacturer of motor devices often manufacture an analog signal inputting motor device or a digital signal inputting motor device depending on the output type of an external controller. Japanese Patent Application Publication No. H05-137375 (JP05-137375A) discloses a configuration in which a control circuit (corresponding to the microcomputer 22 of the present embodiment) is provided in a brushless motor, thereby making it possible to input a digital signal. In order to input an analog signal, however, it is necessary to additionally manufacture a brushless motor provided with no control circuit. With the configuration disclosed in JP05-137375A, it is therefore necessary to manufacture two kinds of motors, which leads to an increase in the manufacturing cost. On the other hand, with the configuration of the present embodiment, the microcomputer 22 is provided in the converter unit 20. In this configuration, if an external controller for outputting a digital signal is used, the motor device 1 manufactured by connecting the converter unit 20 to the motor unit 10 is connected to the external controller. If an external controller for outputting an analog signal is used, the motor unit 10 is connected alone to the external controller. Accordingly, it is only necessary in the present embodiment to manufacture one kind of motor unit 10. This makes it possible to reduce the manufacturing cost.

The motor unit 10 may include a connector having input terminals 15, 16 and 17. The converter unit 20 may include a connector having output terminals 25, 26 and 27. As a result, upon connecting the connector of the motor unit 10 to the connector of the converter unit 20, the input terminals 15, 16 and 17 are respectively connected to the output terminals 25, 26 and 27. This makes it possible to reduce the number of work steps when connecting the input terminals 15, 16 and 17 to the output terminals 25, 26 and 27. The connector of the motor unit 10 may include an output terminal 18 and a grounding terminal 19. The connector of the converter unit 20 may include an input terminal 28 and a grounding terminal 29.

The motor unit 10 may include a first shunt resistor 60 connected to the inverter circuit 12. One end of the first shunt resistor 60 is connected to the microcomputer 22 through the grounding terminals 19 and 29. The microcomputer 22 detects a terminal voltage across the first shunt resistor 60 and calculates a current value by using the Ohm's law. More specifically, the microcomputer 22 detects the motor voltage Vm outputted from the AC/DC converter 21 and the voltage at the grounding side of the first shunt resistor 60, and calculates the current value. The microcomputer 22 compares the calculated current value with a specified current value. If the calculated current value exceeds the specified current value, the microcomputer 22 limits or cuts off the output of the analog speed limiting signal Vsp (Analog).

In other words, upon detecting an over-current flowing through the motor unit 10, the microcomputer 22 limits or cuts off the drive pulse signal supplied from the inverter drive circuit 13 to the inverter circuit 12. As a result, the electric current supplied from the inverter circuit 12 to the motor 11 is limited or cut off. Thus, the rotation speed of the rotor is reduced or the rotation of the rotor is stopped. This makes it possible to protect the motor unit 10.

Figure 2:
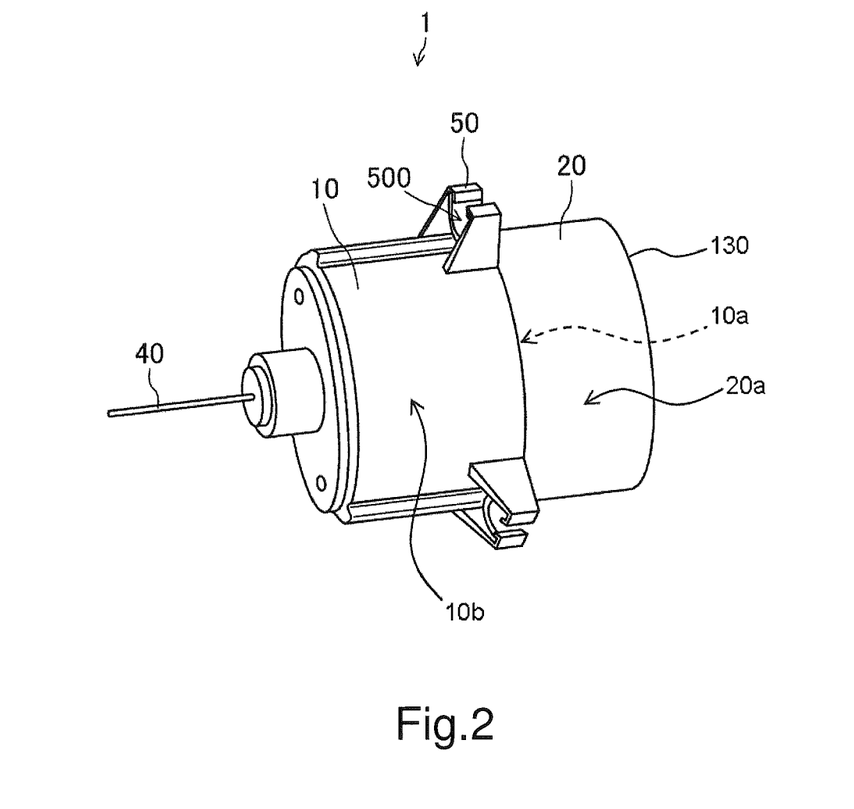
FIG. 2 is a perspective view of the motor device according to at least the first embodiment.

FIG. 2 is a perspective view of the motor device 1 according to at least the first embodiment.

As shown in FIG. 2, in the motor unit 10, the inverter circuit 12, the inverter drive circuit 13 and the motor 11 are encapsulated with a resin. More specifically, in the motor unit 10, at least the stator of the motor 11 and the electric circuit board provided with the inverter circuit 12 (see FIG. 1) and the inverter drive circuit 13 (see FIG. 1) are covered with a resin.

The converter unit 20 is connected to the motor unit 10 at the opposite side to the output side of the motor unit 10. Assuming that the protruding side of the rotating shaft 40 of the motor unit 10 is the "output side", the term "opposite side" means the axially opposite side with respect to the output side. More specifically, the converter unit 20 is connected to an installation surface 10*a* of the motor unit 10. The converter unit 20 is fixed to the installation surface 10*a* of the motor unit 10 by screws or the like. For example, in case where the motor unit 10 and the converter unit 20 are provided with connectors, respectively, it may be configured such that the motor unit 10 and the converter unit 20 are connected to each other by connecting the connectors to each other.

In the present embodiment, the converter unit 20 is included in a case 130. The electric circuit board provided with the AC/DC converter 21 and the microcomputer 22 are accommodated within the case 130. The case 130 may be made of, e.g., a resin or a metal. In the present embodiment, the case 130 is made of a resin. The resin encapsulating the motor unit 10 and the case 130 are formed through different steps and are connected to each other. Since the converter unit 20 is accommodated within the case 130, it is possible to prevent moisture or dirt from adhering to the electric circuit board. Further, the converter unit 20 may not be accommodated within the case 130. The electric circuit board not covered with the case 130 may be connected to the motor unit 10. The case 130 is an example of a covering member.

The motor unit 10 is formed into a cylindrical shape around the rotating shaft 40. The converter unit 20 is formed into a cylindrical shape to have a radial width equal to or smaller than the radial width of the motor unit 10. The term "axial direction" used herein means the direction extending along the rotating shaft 40. The term "radial direction" used herein means the direction orthogonal to the axial direction. The term "circumferential direction" used herein means the direction extending along a concentric circle around the rotating shaft 40. In the present embodiment, the "cylindrical shape" includes a shape having a side surface with no irregularity and a perfectly circular cross section. Needless to say, the "cylindrical shape" may include a shape having a side surface with unevenness having protrusions or grooves and a cross section other than a perfectly circular one.

The motor unit 10 includes protrusions 50 formed on the side surface 10*b* thereof. The side surface 10*b* is a surface extending parallel to the center axis of the motor device 1. The side surface 10*b* is not limited to a surface perfectly parallel to the center axis of the motor device 1 but may be a surface inclined with respect to the center axis of the motor device 1. The protrusions 50 are formed in plural numbers. In the present embodiment, the protrusions 50 are, e.g., three in number so that the motor unit 10 (the motor device 1) can be stably attached to an apparatus-side target attachment portion. Each of the protrusions 50 is provided with a through-hole 500. The through-hole 500 extends through each of the protrusions 50 in the axial direction. The inner diameter of the through-hole 500 is set larger than the outer diameter of a thread groove of a screw but smaller than the outer diameter of a head of the screw.

The motor device 1 (the motor unit 10) can be attached to an apparatus-side target attachment portion by, e.g., passing a screw through the through-hole 500 and inserting the screw into an apparatus-side thread hole. In order to assure easier attachment of the motor device 1 to the target attachment portion, at least a portion of the side surface 20*a* of the converter unit 20 (corresponding to the portion where the screw is positioned) is positioned closer to the center axis than the through-hole 500. The term "center axis" used herein denotes the rotation center of the rotating shaft 40.

With the present embodiment, the converter unit 20 is configured to be connectable to the motor unit 10. Therefore, in case of an apparatus for supplying a DC voltage to a motor, the motor unit 10 without the converter unit 20 can be mounted thereto, and in case of an apparatus for supplying an AC voltage to a motor, the motor device 1 can be mounted thereto. Accordingly, a motor manufacturer can manufacture the motor to which both a DC voltage and an AC voltage can be inputted.

Further, with the present embodiment, the microcomputer 22 is provided in the converter unit 20. For that reason, there is no need to arrange the microcomputer 22 in the electric circuit board of the motor unit 10. This makes it possible to reduce the size of the electric circuit board. Accordingly, as compared with a case where the microcomputer 22 is provided in the motor unit 10, it is possible to reduce the size of the motor unit 10 and the motor device 1.

Further, with the present embodiment, the microcomputer 22 is provided in the converter unit 20. For that reason, as compared with a case where the microcomputer 22 is provided in the motor unit 10, it is possible to reduce the cost involved in manufacturing a motor device that can be connected to an external controller for outputting a digital control signal.

Further, with the present embodiment, the D/A converter 23 is provided in the converter unit 20 to transmit an analog speed limiting signal to the motor unit 10. For that reason, there is no need to arrange the microcomputer 22 in the motor unit 10. This makes it possible to reduce the size of the electric circuit board provided in the motor unit 10. Accordingly, as compared with a case where the microcomputer 22 is provided in the motor unit 10, it is possible to reduce the size of the motor unit 10 and the motor device 1.

Further, with the present embodiment, the first shunt resistor 60 is provided in the motor unit 10. It is therefore possible to protect the motor unit 10 (especially, the inverter circuit 12) from an over-current.

Further, since the motor unit 10 of the present embodiment is covered with a resin, it is possible to prevent moisture or dirt from infiltrating into the motor unit 10. Inasmuch as the motor unit 10 is covered with a resin, it is possible to efficiently dissipate the heat generated by the stator and the electric circuit board of the motor 11 to the outside.

In the present embodiment, the converter unit 20 is fixed to the anti-output side (the installation surface 10*a*) of the motor unit 10. Alternatively, the converter unit 20 may be connected to the side surface 10*b* of the motor unit 10. The side surface 10*b* is the outer cylindrical surface of the motor unit 10 and is adjacent to the installation surface 10*a*. In case where the converter unit 20 is connected to the side surface 10*b* of the motor unit 10, it is possible that the side surface 10*b* of the motor unit 10 includes a planar surface to which the converter unit 20 can be connected.

In the present embodiment, the shape of the motor unit 10 may be a square column shape or other shapes without being limited to the cylindrical shape, and the converter unit 20 can be connected to the motor unit 10 having such a shape just like the present embodiment. Accordingly, it is possible to obtain the same effects as provided by the present embodiment.

In the present embodiment, the protrusions 50 are formed on the side surface 10*b* of the motor unit 10. However, the protrusions 50 may be omitted if the motor unit 10 can be fixed to an apparatus-side target attachment portion without using the protrusions 50. For example, the apparatus-side target attachment portion may be provided with a hole to which the motor unit 10 or the motor device 1 can be press-fitted. In this configuration, even if the motor unit 10 is not provided with the protrusions 50, the motor unit 10 or the motor device 1 can be held in the apparatus-side target attachment portion.

Further, the converter unit 20 may be connected to the motor unit 10 by using various connection configurations without being limited to a screw. A claw may be formed in one of the motor unit 10 and the converter unit 20 and a hole engageable with the claw may be formed in the other. The converter unit 20 can be connected to the motor unit 10 by bringing the claw into engagement with the hole. The converter unit 20 may be connected to the motor unit 10 by an adhesive agent.

Further, it is not essential to cover the motor unit 10 with a resin. The present invention is applicable to a motor unit which is not covered with a resin.

Further, the AC/DC converter 21 and the microcomputer 22 are arranged in a single electric circuit board. With this configuration, it is possible to reduce the number of work steps when assembling the converter unit 20.

In the present embodiment, the motor unit 10 includes the inverter circuit 12 and the inverter drive circuit 13 which are arranged independently of each other. As an alternative example, the inverter circuit 12 and the inverter drive circuit 13 may be provided in a single IC.

Further, the converter unit 20 may be provided with a notification means for notifying an abnormality generated in the motor unit 10. More specifically, the microcomputer 22 determines generation of an abnormality in the motor unit 10 by referring to the digital speed limiting signal and the FG signal. If it is determined that an abnormality is generated in the motor unit 10, the microcomputer 22 transmits a notification command to the notification means. Upon receiving the notification command from the microcomputer 22, the notification means performs a notifying operation such as alarm sound or the like. The notifying operation performed by the notification means is not limited to the alarm sound but may be the lighting of an LED or the displaying of an error message on a display.

While the motor device 1 of the present embodiment is configured to connect the connector of the motor unit 10 and the connector of the converter unit 20 to each other, it may be possible to employ other connection methods. For example, the motor device 1 may have a configuration in which the motor unit 10 is provided with a connector and the converter unit 20 is provided with a flexible printed circuit board (hereinafter referred to as "FPC") such that the FPC is connected to the connector of the motor unit 10. On the other hand, the motor device 1 may have a configuration in which the motor unit 10 is provided with a FPC and the converter unit 20 is provided with a connector such that the FPC is connected to the connector of the converter unit 20. In addition, the motor device 1 may have a configuration in which one of the motor unit 10 and the converter unit 20 is provided with a lead line whose terminal is connected to an electric circuit board of the other of the motor unit 10 and the converter unit 20 by a soldering or the like.

In the present embodiment, in order to detect the terminal voltage across the first shunt resistor 60, the microcomputer 22 is configured to detect the motor voltage Vm outputted from the AC/DC converter 21 and the voltage at the grounding side of the first shunt resistor 60. However, the present invention is not limited thereto. For example, there may be provided an electrically conductive line, one end of which is connected to a node between the inverter circuit 12 and the first shunt resistor 60 and the other end of which is connected to the microcomputer 22. Even in this configuration, the microcomputer 22 can be configured to detect the terminal voltage across the first shunt resistor 60.

Figure 4:
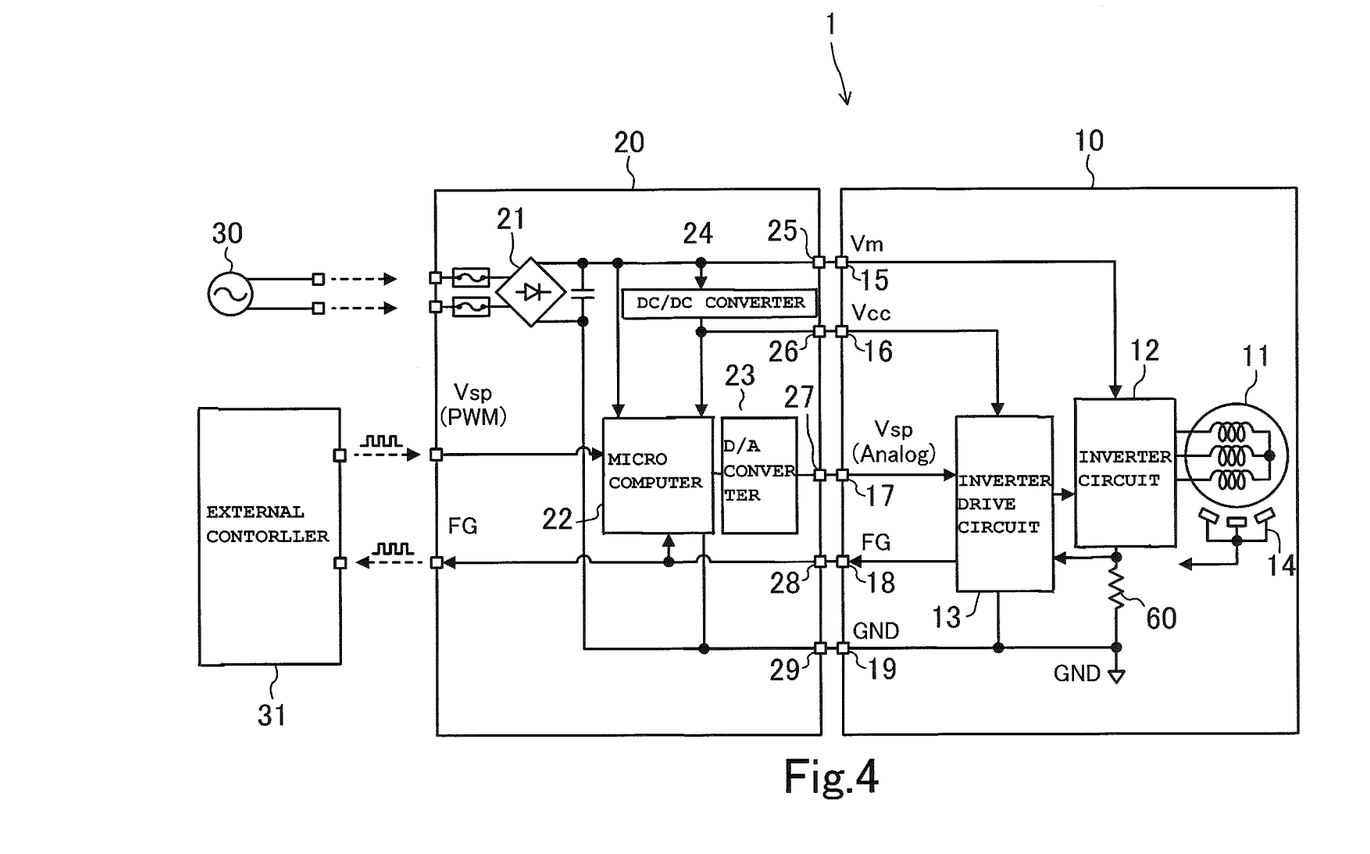
FIG. 4 is a block diagram showing a first modification of the motor device according to at least the first embodiment.

Further, the inverter drive circuit 13 may be configured to perform a function of detecting the terminal voltage across the first shunt resistor 60 and limiting the electric current flowing through the inverter circuit 12. In this case, as shown in FIG. 4, there may be provided an electrically conductive line, one end of which is connected to a node between the inverter circuit 12 and the first shunt resistor 60 and the other end of which is connected to the inverter drive circuit 13. FIG. 4 shows a circuit configuration of a first modification of the motor device 1 according to the present embodiment. With this configuration, the motor unit 10 can limit the electric current flowing through the inverter circuit 12 without relying on the control of the microcomputer 22 and the external controller 31 and can protect the inverter circuit 12 and the motor 11 from an over-current. In other words, the motor unit 10 can realize an over-current protection function by itself.

Figure 5:
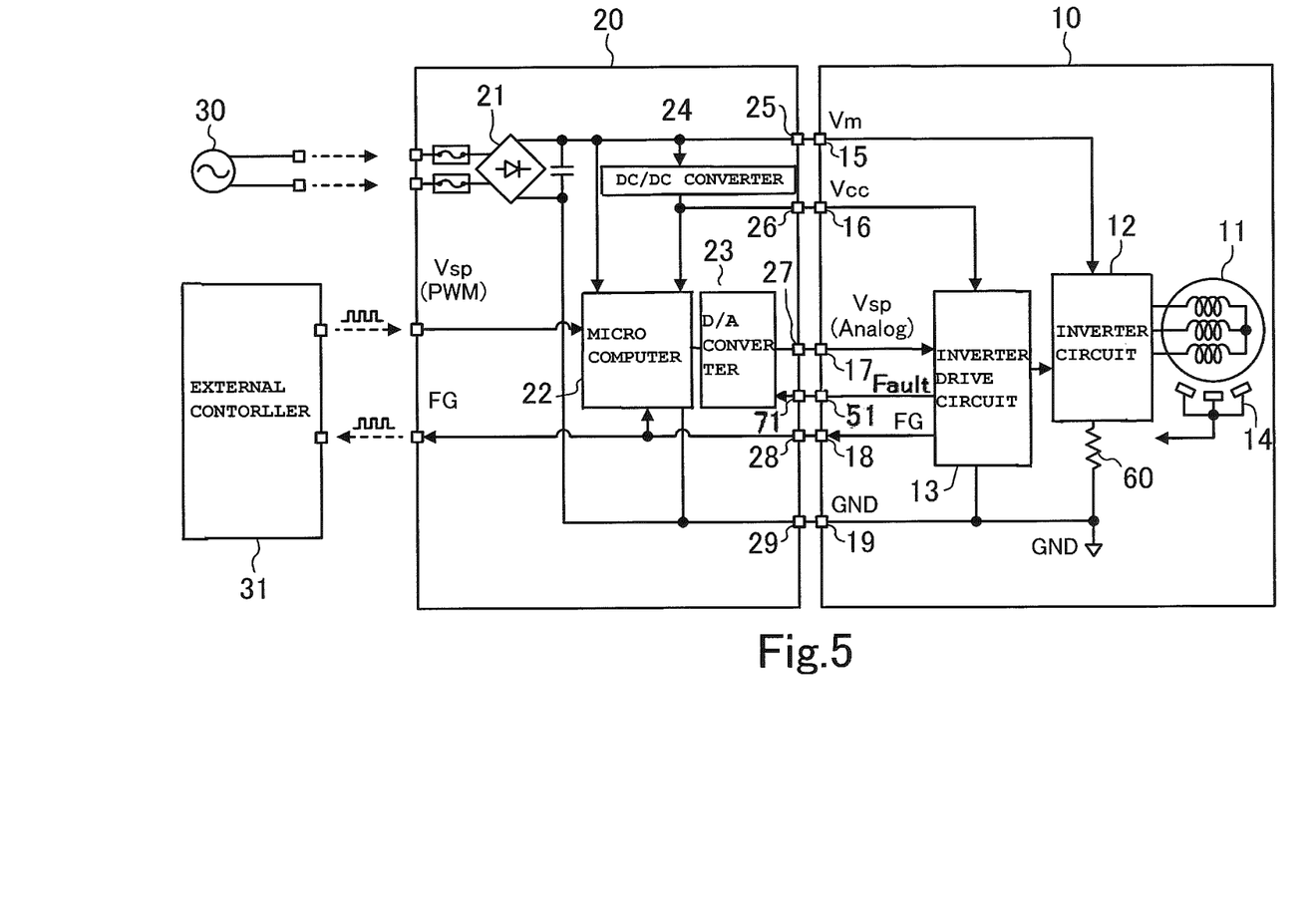
FIG. 5 is a block diagram showing a second modification of the motor device according to at least the first embodiment.

Further, it may be possible to employ a configuration in which the inverter drive circuit 13 transmits a fault signal to the microcomputer 22. More specifically, as shown in FIG. 5, the motor unit 10 may be provided with an output terminal 51 and the converter unit 20 may be provided with an input terminal 71. FIG. 5 shows a circuit configuration of a second modification of the motor device 1 according to the present embodiment. The output terminal 51 is connected to the inverter drive circuit 13 in the motor unit 10. The input terminal 71 is connected to the microcomputer 22 in the converter unit 20. The output terminal 51 and the input terminal 71 are connected to each other. When an abnormality is detected in the motor 11 or the inverter circuit 12, the inverter drive circuit 13 transmits a fault signal to the microcomputer 22. The fault signal is a signal indicating an abnormality generated in the motor 11 or the inverter circuit 12.

Figure 6:
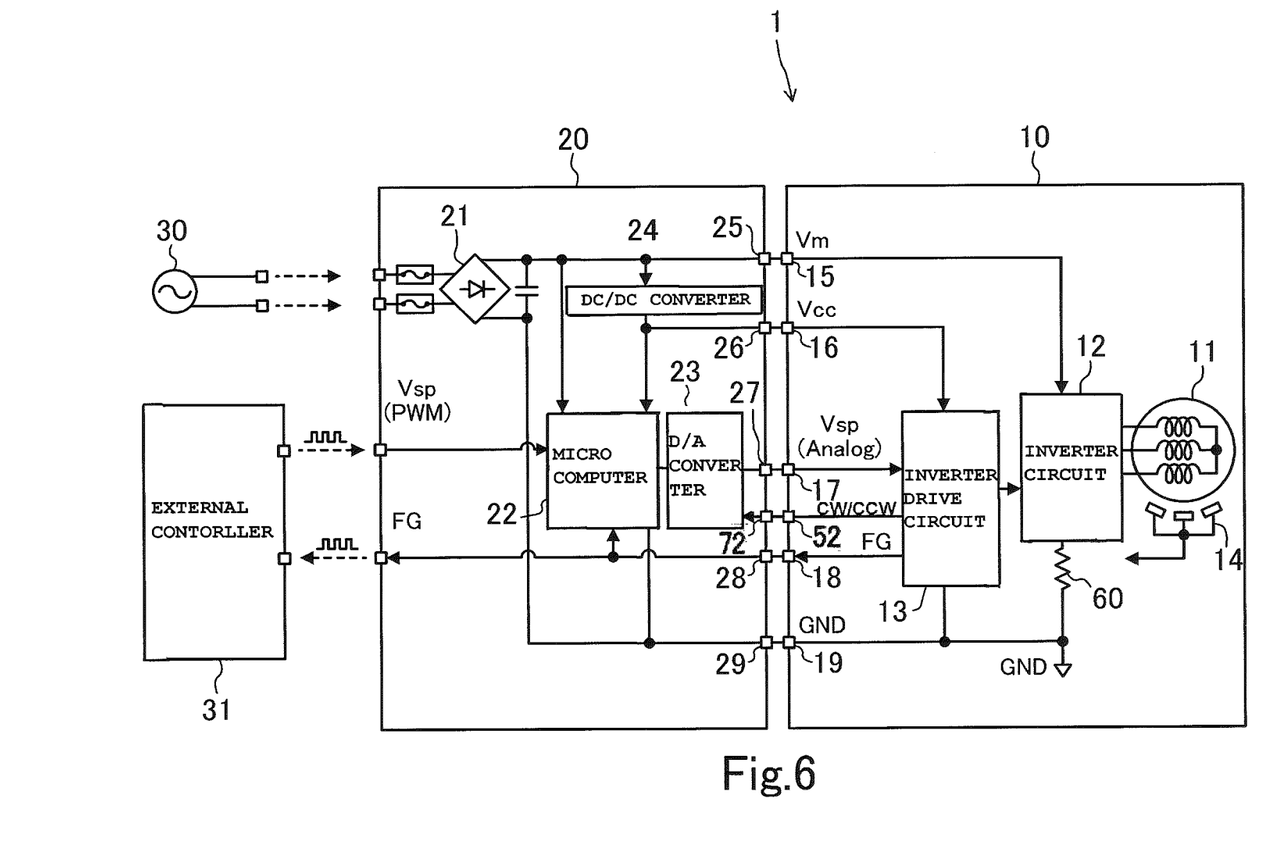
FIG. 6 is a block diagram showing a third modification of the motor device according to the at least first embodiment.

Further, it may be possible to employ a configuration in which the microcomputer 22 transmits a rotation direction signal (CW or CCW) to the inverter drive circuit 13. More specifically, as shown in FIG. 6, the motor unit 10 may be provided with an input terminal 52 and the converter unit 20 may be provided with an output terminal 72. FIG. 6 shows a circuit configuration of a third modification of the motor device 1 according to the present embodiment. The input terminal 52 is connected to the inverter drive circuit 13 in the motor unit 10. The output terminal 72 is connected to the microcomputer 22 in the converter unit 20. The input terminal 52 and the output terminal 72 are connected to each other. The microcomputer 22 can transmit a rotation direction signal indicating the rotation direction of the rotor of the motor 11 to the inverter drive circuit 13. The rotation direction signal CW is a signal indicating the clockwise rotation of the rotor. The rotation direction signal CCW is a signal indicating the counterclockwise rotation of the rotor.

Figure 3:
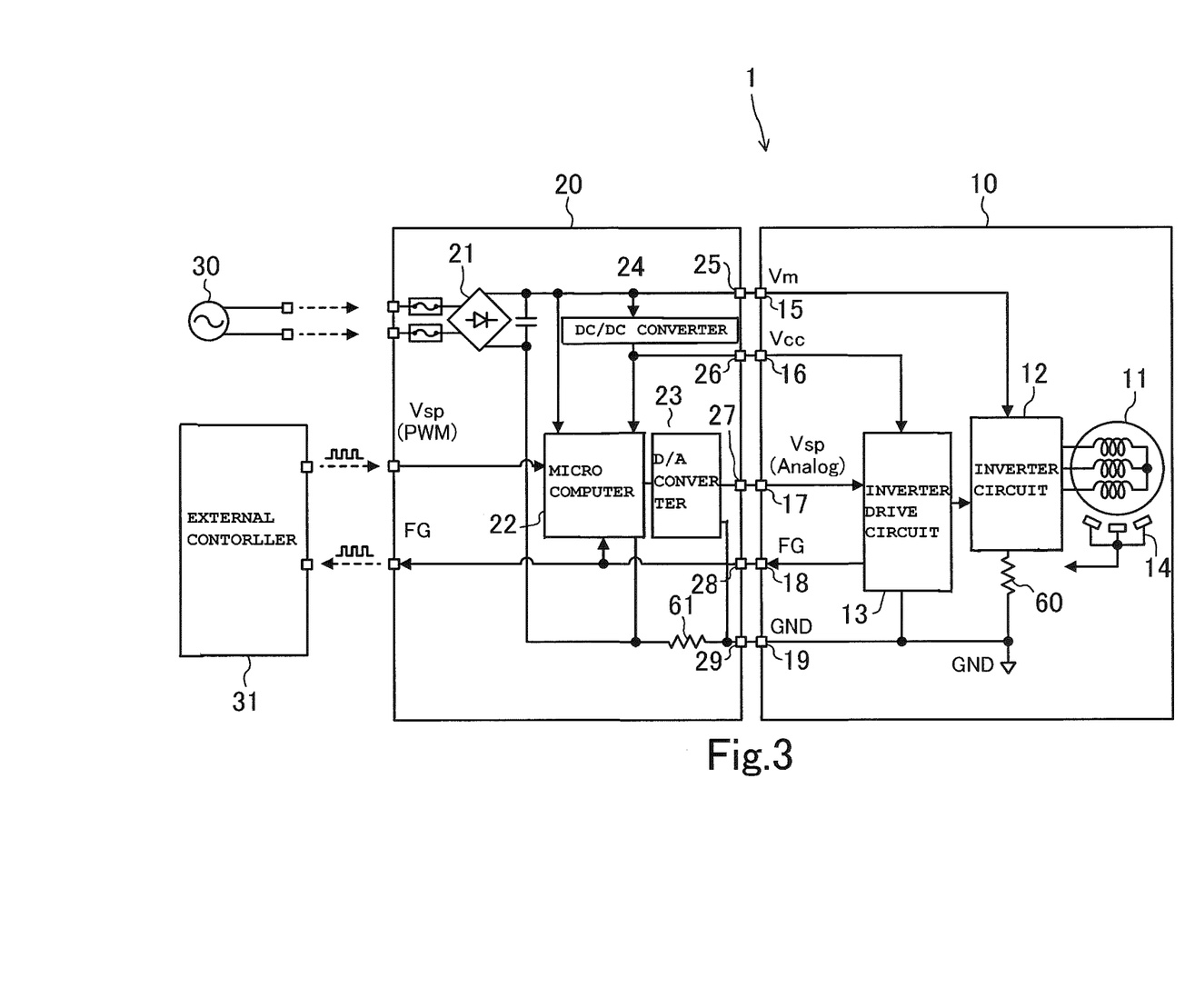
FIG. 3 is a block diagram showing a motor device according to at least a second embodiment.

FIG. 3 is a block diagram showing a motor device 1 according to at least a second embodiment of the present invention.

As shown in FIG. 3, the motor device 1 according to the present embodiment includes a second shunt resistor 61 provided in the converter unit 20 of the motor device 1 shown in FIG. 1.

One end of the second shunt resistor 61 is connected to the first shunt resistor 60 through the grounding terminals 19 and 29. The other end of the second shunt resistor 61 is connected to the microcomputer 22. The converter unit 20 includes an electrically conductive line. One end of the electrically conductive line is connected to a node between the grounding terminal 29 and the second shunt resistor 61. The other end of the electrically conductive line is connected to the microcomputer 22.

The microcomputer 22 detects a terminal voltage across the second shunt resistor 61 and calculates a current value by using the Ohm's law. The microcomputer 22 compares the calculated current value with a specified current value. If the calculated current value exceeds the specified current value, the microcomputer 22 limits or cuts off the output of the analog speed limiting signal Vsp (Analog).

With the present embodiment, the second shunt resistor 61 is provided in the converter unit 20. Therefore, even if the first shunt resistor 60 is damaged by an over-current so that the resistance value is decreased, the microcomputer 22 can detect the terminal voltage across the second shunt resistor 61 and can calculate the current value flowing through the inverter circuit 12. Accordingly, the microcomputer 22 limits or cuts off the drive pulse signal when an over-current flows through the inverter circuit 12. This makes it possible to protect the motor unit 10. The drive pulse signal is supplied from the inverter drive circuit 13 to the inverter circuit 12. In particular, it is possible to prevent an over-current from flowing through the inverter circuit 12 for a long period of time and to prevent the inverter circuit 12 from being damaged.

The number of the second shunt resistor 61 is not limited to one but may be plural.

In the present embodiment, the microcomputer 22 is configured to detect the motor voltage Vm outputted from the AC/DC converter 21 and the voltage of the grounding terminal 29 in order to detect the terminal voltage across the first shunt resistor 60. However, the present invention is not limited to this configuration. For example, there may be provided an electrically conductive line which is connected to a node between the inverter circuit 12 and the first shunt resistor 60 and to the microcomputer 22. Even in this configuration, the microcomputer 22 can be configured to detect the terminal voltage across the first shunt resistor 60.

Further, the inverter drive circuit 13 may be configured to perform a function of detecting the terminal voltage across the first shunt resistor 60 and limiting the electric current flowing through the inverter circuit 12. In this case, there may be provided an electrically conductive line, one end of which is connected to a node between the inverter circuit 12 and the first shunt resistor 60 and the other end of which is connected to the inverter drive circuit 13. With this configuration, the motor unit 10 can limit the electric current flowing through the inverter circuit 12 without relying on the control of the microcomputer 22 and the external controller 31 and can protect the inverter circuit 12 and the motor 11 from an over-current. In other words, the motor unit 10 can realize an over-current protection function by itself.

The second shunt resistor 61 shown in FIG. 3 may be provided in the circuit configuration shown in FIG. 4. Further, the second shunt resistor 61 shown in FIG. 3 may be provided in the circuit configuration shown in FIG. 5. Further, the second shunt resistor 61 shown in FIG. 3 may be provided in the circuit configuration shown in FIG. 6.

While certain embodiments of the present invention have been described above, the present invention is not limited to these embodiments but may of course be modified in many different forms. In the foregoing embodiments, description has been made on an example in which the converter unit 20 is accommodated within a case. Alternatively, the converter unit 20 may be covered with a covering member. As another alternative example, the electric circuit board on which the AC/DC converter 21 and the microcomputer 22 are arranged may be potted with a resin.

In the foregoing embodiments, description has been made on an example in which the motor unit 10 and the converter unit 20 have a cylindrical shape. However, the present invention is not limited thereto. The motor unit 10 and the converter unit 20 may have a shape other than the cylindrical shape.

The kind and control method of the motor 11 is not particularly limited. Different kinds of motors available in the related art and control methods thereof can be used.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor device, comprising:
a motor unit comprising:
an inverter circuit;
an inverter drive circuit;
a brushless DC motor comprising a rotor and a stator;
a first shunt resistor connected to the inverter circuit;
a first motor unit input terminal connected to the inverter drive circuit;
a second motor unit input terminal connected to the inverter circuit;
a third motor unit input terminal connected to the inverter drive circuit;
a first motor unit output terminal connected to the inverter drive circuit; and
a first ground terminal connected to the inverter circuit;
a converter unit comprising:
a case;
a AC/DC converter structured to convert an AC voltage to a DC voltage to be supplied to the motor unit;
a microcomputer structured to receive a digital control signal and output an analog control signal;
a first converter unit output terminal structured to output the analog control signal;
a second converter unit output terminal structured to output the DC voltage to be supplied to the inverter circuit;
a third converter unit output terminal structured to output the DC voltage to be supplied to the inverter drive circuit;
a first converter unit input terminal structured to receive the position detection signal;
a second shunt resistor connected to the first shunt resistor and the microcomputer; and
a second grounding terminal;
wherein the AC/DC converter and the microcomputer are provided within the case;
wherein the case of converter unit is connected to the motor unit at the installation surface of the motor unit;
the first motor unit input terminal and the first converter unit output terminal are connected;
the second motor unit input terminal and the second converter unit output terminal are connected;
the third motor unit input terminal and the third converter unit output terminal are connected;
the first motor unit output terminal and the first converter unit input terminal are connected;
the first grounding terminal and the second grounding terminal are connected;
the inverter drive circuit is structured to receive the analog control signal outputted from the microcomputer and output a drive pulse signal to be supplied to the inverter circuit; and
wherein the microcomputer is configured to detect a terminal voltage across the second shunt resistor, to calculate a current value by using the terminal voltage and a resistance value of the second shunt resistor, to compare the current value with a specified current value, and to limit or cut off the output of the analog control signal when the current value exceeds the specified current value.

2. The motor device of claim 1, wherein the converter unit is covered with a covering member and is connected to the motor unit at an opposite side to an output side of a rotating shaft of the motor unit or at a side parallel to the rotating shaft of the motor unit.

3. The motor device of claim 1, wherein
the microcomputer is configured to detect a terminal voltage across the first shunt resistor, to calculate a current value by using the terminal voltage and a resistance value of the first shunt resistor, to compare the current value with a specified current value and to limit or cut off the output of the analog control signal when the current value exceeds the specified current value.

4. The motor device of claim 1, wherein
the inverter drive circuit is configured to control an operation of the inverter circuit by detecting a terminal voltage across the first shunt resistor.

5. The motor device of claim 3, wherein the inverter drive circuit is configured to transmit an error signal indicating a status of the brushless DC motor to the microcomputer.

6. The motor device of claim 4, wherein the inverter drive circuit is configured to transmit an error signal indicating a status of the brushless DC motor to the microcomputer.

7. The motor device of claim 1, wherein the microcomputer is configured to transmit a rotation direction signal indicating a rotation direction of the brushless DC motor to the inverter drive circuit.

8. The motor device of claim 1, wherein the motor unit is covered with a resin.

9. The motor device of claim 1, wherein the converter unit comprises an electric circuit board on which the AC/DC converter and the microcomputer are arranged.

10. The motor device of claim 1, wherein the motor unit is formed into a cylindrical shape around a rotation axis,
the converter unit is formed into a cylindrical shape to have a radial dimension equal to or smaller than a radial dimension of the motor unit, and
the converter unit is arranged at an opposite side to an output side of the motor unit.

11. The motor device of claim 1, wherein the motor unit has a through-hole, which is formed at a radial edge of the motor unit to extend in an axial direction of a rotation axis, and
at least a portion of an outer circumferential surface of the converter unit is positioned closer to the rotation axis than the through-hole.

12. The motor device of claim 1, wherein the converter unit is fixed to the installation surface of the motor unit by screws.

13. The motor device of claim 1, wherein the case of the converter unit comprises resin.

* * * * *